July 16, 1963
A. J. SICILIANO
3,097,735
SPROCKET WHEELS
Filed June 15, 1960
2 Sheets-Sheet 1
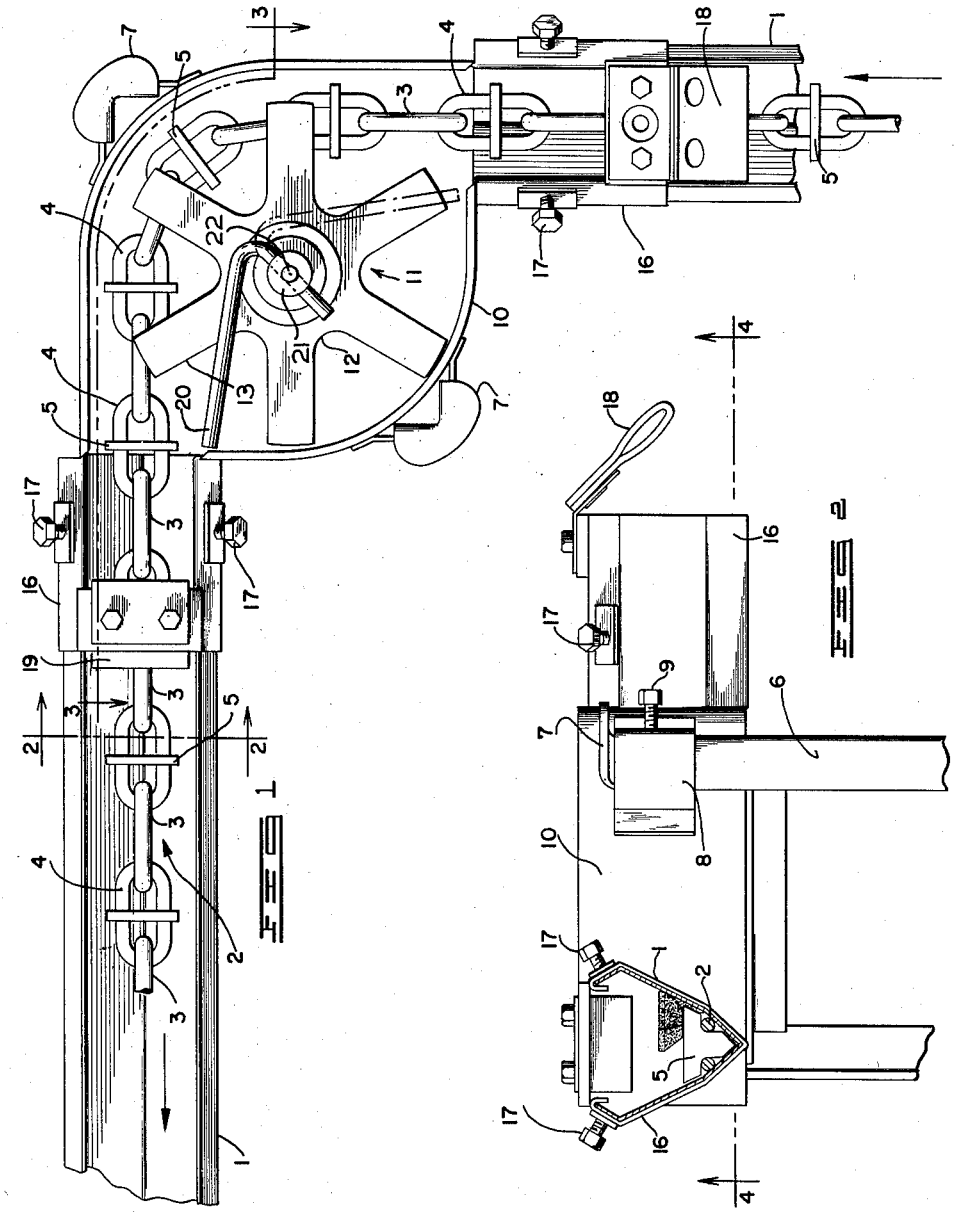
INVENTOR
Anthony J. Siciliano
BY Albert H. Kichner
ATTORNEY

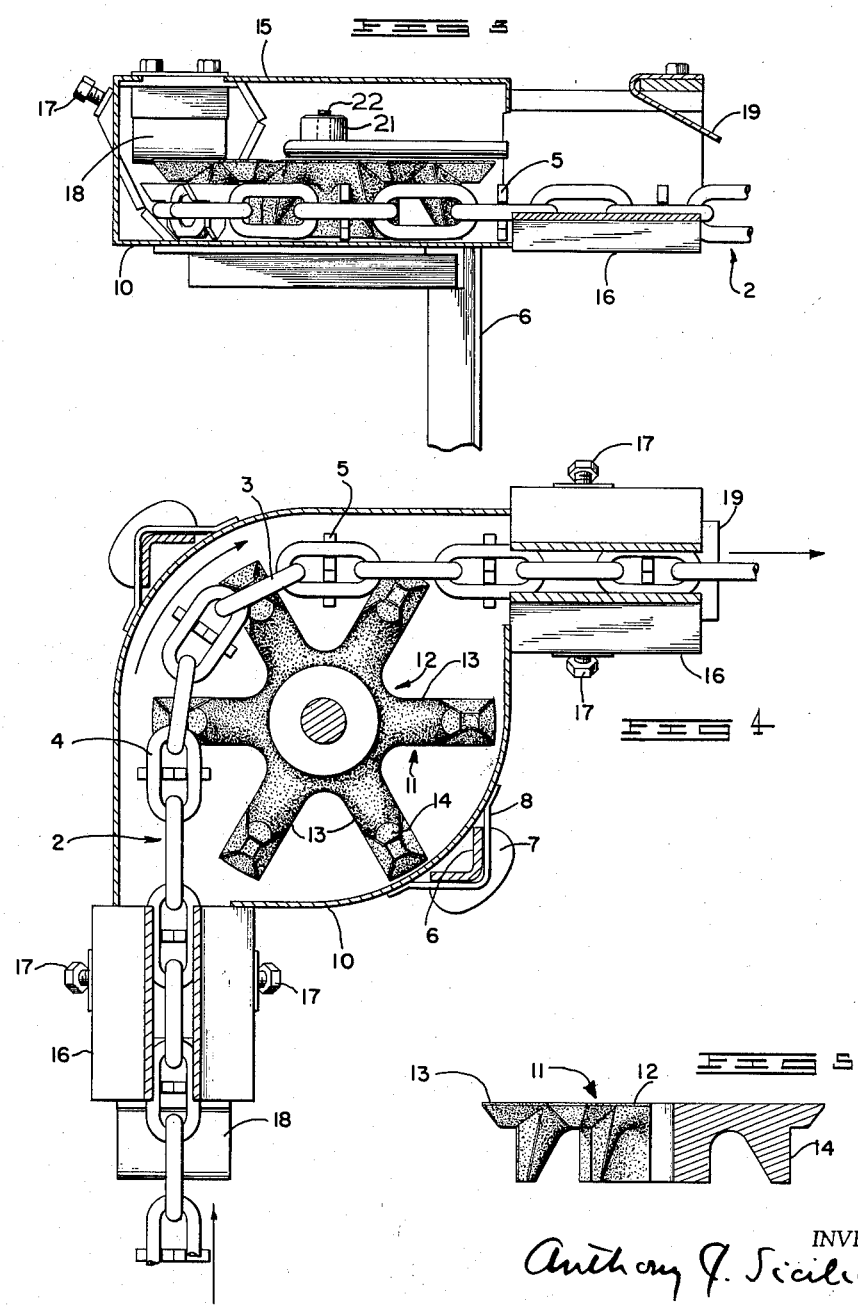

United States Patent Office 3,097,735
Patented July 16, 1963

3,097,735
SPROCKET WHEELS
Anthony J. Siciliano, Vineland, N.J., assignor to Keen Manufacturing Corporation, Vineland, N.J., a corporation of New Jersey
Filed June 15, 1960, Ser. No. 36,280
7 Claims. (Cl. 198—171)

The present invention relates to sprocket wheels, and more particularly to an idler sprocket wheel especially designed and intended for use in an automatic feed conveyor for poultry and the like and for special cooperation in such equipment with a particular design of conveyor chain.

Automatic feed conveyors are extensively used in establishments where chickens and other poultry are raised on a large scale. The conveyor comprises an endless flexible medium, such as a sprocket chain, lying in the bottom of a channel trough of V or U shape in cross section, arranged in a rectangular or other closed-figure shape, mounted in a generally horizontal plane on the ground or on the floor of a building. The flexible member, by preference a chain and hereinafter so designated, is drawn at slow speed along the bottom of the trough, through or past a source of supply of feed, which is generally a mixture of cereal grains and the like, and pushes the feed through the trough. The stock, typically a flock of chickens, stand at the side of the trough and consume the feed as it moves along. The chain traverses the whole circuit, returning to the supply hopper to pick up more of the feed material and move it along the trough as before, repeating the cycle as long as the driving motor continues in operation.

The trough is necessarily provided at all but one of its corners, which are at least three in number and are generally four, with idler sprocket wheels whose function is to constrain the chain to its position in the bottom of the trough and guide it into a new direction, as around one of the sides of the rectangular or other shape in which the trough is arranged. Another sprocket wheel in the system, almost universally a single one at one corner, is driven by a motor so as to propel the chain. The present invention is concerned primarily with the idler sprocket wheels rather than the driving wheel, and its purpose is to provide an idler sprocket wheel that will be proof against jamming, stalling, and damages resulting from hard foreign objects sometimes found in the feed being caught between the chain and the wheel.

Such objects, which commonly comprise such things as pebbles, nails, nuts, bolts, screws and other small metallic parts, as well as hard fibrous material such as pieces of corn cob, sticks, twigs, and the like, are particularly troublesome when the conventional toothed idler sprocket wheels are used in combination with a link chain type of conveyor medium. In such cases the required penetration of the teeth of the wheels into the links is in some instances prevented by the interposition of the foreign matter, so that the chain is thrown off the wheel, and at other times the chain binds on the wheel, thus stalling the motor and even breaking the chain or distorting it and/or the teeth of the wheel.

To accomplish the primary purpose of the present invention of preventing such damage and faulty operation, the invention provides a sprocket wheel of special form which will cooperate with a particular type of chain so as to pass all foreign objects harmlessly and continue in operation without stopping and without damage to the wheel, chain, trough or other parts of the feeder mechanism or installation.

A special object of the invention also is to provide a novel combination of a particular form of sprocket wheel and a particular kind of conveyor chain in which these two components of an automatic feeder for poultry and the like will cooperate in a new manner to obviate the objections and faults hereinabove explained.

Various detailed advantages of the new construction, more or less related to the foregoing features, will more clearly appear as the preferred embodiment selected to illustrate the invention in the accompanying drawings proceeds in the following specification.

In these drawings in which the preferred embodiment is illustrated,

FIGURE 1 is a top plan view of one corner of a poultry feeder of the endless chain conveyor type, showing an idler sprocket wheel embodying the present invention installed in operative relation to the chain and housing structure, with the housing cover removed;

FIG. 2 is an elevational view of the corner shown in FIG. 1, taken from a sectional plane shown at 2—2 in FIG. 1 through a portion of the conveyor trough;

FIG. 3 is a vertical sectional view taken on the line 3—3 of FIG. 1;

FIG. 4 is a horizontal sectional view taken on the line 4—4 of FIG. 2, looking in the direction of the arrows and showing the sprocket wheel and appurtenant parts in bottom plan; and FIG. 5 is a detail view, partly in section, of the sprocket wheel.

In these figures the reference numeral 1 designates generally a trough of a type well known in automatic or mechanical feeders for poultry and the like. The cross section is substantially V-shaped, and the trough contains a conveyor chain 2 that lies in the vertex at which the sheet metal sides meet to form the bottom of the trough. The trough is constructed in a continuous circuit, generally rectangular, and at one point has superposed over it a hopper for supplying feed to it. The feed is commonly a mixture of cereal grains, and it is propelled through the trough by movement of the chain at slow speed. The chain is for this purpose best made with alternate links disposed in horizontal and vertical planes, as shown for example in FIG. 1 where the vertical links are designated 3 and the horizontal links are designated 4, and in some cases it is found desirable to augment the conveying capacity of the chain by inserting flights 5 in some or all of the horizontal links.

The chain is driven through or beneath the supply hopper, thus picking up a quantity of feed, and propels this feed progressively around the trough. The poultry or other stock stand on the floor and eat the feed in the trough, which is conveniently provided with adjustable legs 6 at appropriate spacings for regulating the height of the trough to suit the size of the feeding animals. In the illustrated embodiment of the invention the legs 6 are simple lengths of angle iron having turned over retaining top ends 7 and are secured in adjusted heights in brackets 8 by setscrews 9, as best shown by FIG. 2.

The leg bracket 8 here shown is welded to a housing 10 which encloses an idler sprocket wheel 11 at a point where the trough is cornered and at which, consequently, the conveyor chain must change its direction. Normally in a conventional layout there are four corners, with the trough disposed in rectangular plan and the conveyor chain being endless and making a complete circuit about the rectangular shape. One of the corners, and only one, houses a drive sprocket wheel, which is rotated by an electric motor coupled to it with a suitable gear reduction device, and each of the other corners houses an idler sprocket wheel, like the one shown and designated 11, whose function is to guide the chain to its changed direction and keep it on its course. As has been stated, the present invention is concerned principally with these idler sprocket wheels and their mounting and relationship to the chain and its housing.

Each sprocket wheel 11 comprises a central hub 12 which is axially bored or otherwise formed for mounting to rotate about a vertical axis. The details of the bearing and its mounting form no part of the present invention and hence are not shown. Integral with the hub are a number of radiating arms or spokes 13, set equidistantly about the hub axis and all terminating in outer ends that are free and unconnected with each other. That is to say, the wheel is rimless. The upper surfaces of the spokes are flat and coplanar, and intermediate the hub and the free end each spoke has an integrally formed, downwardly projecting foot 14. The wheel may be a stout iron casting, with all its parts, hub spokes and feet, integral.

The wheel is rotated by the advancing chain. Torque is applied to the wheel by the leading edges of the horizontal links acting as shoulders bearing against the feet 14, as best shown in FIG. 4. As also there shown, the parts, chain and sprocket wheel, are so proportioned that all of the spokes that are engaged by the chain at any given position of the wheel (two in the case of the six-spoke wheel shown) make exactly the same kind of contact. Thus, each of the two chain-contacted spokes has the inner leading edge of a horizontal link 4 of the chain pushing against the foot depending from that spoke, and the circumferentially outer side of that foot is engaged by the inner side of the next adjacent forwardly positioned vertical link 3. This relationship of the parts continues progressively for all the links and all the spokes and feet as the chain is pulled through the trough and turns the sprocket wheel.

Repeated experiments have demonstrated conclusively that sprocket wheels, constructed as shown and described herein, when mounted as idler wheels and driven by a conveyor chain, will not jam despite any inordinately large quantity of hard foreign objects that may be present in the feed material that is propelled through the trough. In actual practice it is found that not infrequently such hard foreign matter as pebbles, nuts, bolts, nails, and other small metallic objects, and fibrous material such as pieces of corn cob, small sticks, twigs and the like, find their way into the feed. When objects of this kind encounter the conventional idler wheels of the prior art they frequently jam and stall the conveyor. Even when this does not result in distortion of and damage to the chain and/or the wheel, annoyance is caused by the stopping of the chain and the consequent halting of the feed supply, as has been explained hereinabove. Frequently the overloading of the driving motor causes a fuse to blow out or in some cases damage to the motor itself. Such eventualities are eliminated by use of the new sprocket wheel. It is found that practically any foreign object, whether hard like a pebble or a piece of metal, or fibrous like corn cobs, twigs and the like, will be pushed to one side, either radially outward or radially inward of the wheel spokes, and remain in the wheel housing from which it can be removed in a periodic cleaning operation. It is believed that this action of the wheel in pushing the foreign objects to one side, instead of holding and clamping them between the wheel and the chain as in the prior art constructions, results from the fact that the surfaces of the wheel parts that are engaged by the chain are rounded, and the related further fact that the surfaces of the chain that engage the wheel to drive it are also rounded, so that the actual areas of contact of chain to wheel are really tangent lines of curved surfaces between which it is practically impossible for any interposed object or material to remain in stable position as the chain and wheel proceed in their relative movement. This, it is believed, will be clearly apparent from the view in FIG. 4, in which it will be noted that the wheel spoke feet 14 in the nine and eleven o'clock positions of the wheel are engaged respectively in pushing position by two of the horizontal links 4 of the chain, and it will be observed that the surfaces of these links that contact with the feet are curved or rounded surfaces. Thus, any object that might happen to be carried with the feed into the wheel housing, and to be pushed by the advancing shoulder of a horizontal link all the way up to the foot that that link is to engage, will be squeezed out, to one side or the other, as the space between the link shoulder and the wheel spoke foot decreases and the two parts finally come into engagement by practically nothing more than line contact.

It should be noted that there is considerable advantage in so proportioning the chain and the wheel that the circumferential distance between two adjacent wheel feet is rather precisely the same as the distance between the leading shoulders of two adjacent horizontal links of the chain. This relationship is seen in FIG. 4, where it will be observed that two contiguous horizontal links are in pushing position on two adjacent feet, with practically no clearance. This proportioning of the chain and wheel components of the combination has been found to minimize wear. The wheel is continually driven by engagement at all times of two links on two feet, and the engagement is a rolling one of one curved or rounded surface on another curved or rounded surface. During this driving operation it will be noted that the chain is stabilized in its connection to the wheel by the broad contact at all times of two of the vertical links with two of the feet. The contact is a broad one because it extends lengthwise of the foot, with both the upper and the lower run of the vertical link making contact with the foot, as shown in FIGS. 3 and 4. This engagement materially enhances the stability of the connection of the chain to the wheel.

The housing or casing 10 which encloses the sprocket wheel is provided with a cover plate 15 that is made detachable for periodic cleaning of the interior, to permit removal of all accumulated foreign objects. The entry and discharge ends of the housing are appropriately related at the proper angle for connection to two sections 1 of the trough, shown as right angular in the illustrated embodiment of a portion of a rectangular arrangement. Connection to the trough sections is made by telescoping the end margins of the sections into similarly shaped end portions 16 of the sprocket wheel housing, with the connection fixed by set screws 17. To prevent the chickens getting their heads into the sprocket wheel housing the end portions 16 may be covered by flaps, such as are shown at 18, 19. The flap 19 at the outlet end may be a stiff piece of sheet metal, while that designated 18 at the inlet end is best made of flexible material, such as a folded strap of rubber, plastic or heavy canvas.

A detail of the full commercial embodiment of the invention that has been found useful in actual practice is the particular mounting of the sprocket wheel. While, as has been stated hereinabove, the wheel may be journaled in any of numerous ways within the broad principles of the invention, it is advantageous to employ this preferred mounting shown in the drawing. In this construction the post 21 is fixed against rotation and the hub of the sprocket wheel is journaled on the post, being held thereon by a retaining rod 20 having a bent end portion that extends through a diametric hole in the post and is held in place by a setscrew 22 threaded axially into the top of the post. Thus the rod insures proper and full seating of the wheel on the post when replaced after removal for cleaning, and it serves the further purpose of scraping the feed from the flat top surfaces of the spokes as the wheel rotates. For this purpose the rod is inserted through the hole in the post so as to extend in the direction of travel of the conveyor chain, as shown in full lines in FIG. 1. However, if at any time for any reason the direction of chain travel is reversed, as sometimes becomes desirable or necessary, the rod can readily be withdrawn and reinserted in the opposite position, as shown in broken lines in the figure.

An advantage of the new construction is that the chain is kept well confined between the floor of the corner casing 10 and the radially protruding end portions of the wheel feet 14 and is not "synchronized" with the wheel or its spokes. Thus it is difficult or impossible for the chain to become disengaged with the wheel by moving up above or down below the portions of the wheel, i.e., the feet 14, with which it is operatively engaged, and even if the chain should slip the distance of a link or even several links, as by being pushed radially outwardly by the interposition of a corn cob or the like between a link and the adjacent wheel foot 14, the chain will reposition itself properly, immediately upon the foreign object being passed, with the advancing shoulder of the next horizontal link bearing against one of the feet to resume rotation of the wheel.

It is believed that the essential principles of the new sprocket wheel and its combination with the conveyor chain will be clear from the foregoing description and that it will be understood that changes in specific details may be made without departing from the principles of the invention as defined by the more broadly worded of the appended claims.

I claim:

1. A non-jamming idler sprocket wheel for the conveyor chain of a poultry feeding device or the like comprising a hub having a flat bottom surface, means mounting the hub for rotation about a central vertical axis, a plurality of spokes radiating from the hub and having their outer ends free and unconnected with each other and providing inter-spoke spaces flaring radially outwardly from said hub, and a foot rigid with and depending from each spoke intermediate between the hub and the free end of the spoke and terminating in a free end in substantially the plane of the flat bottom surface of the hub.

2. A non-jamming idler sprocket wheel for the conveyor chain of a poultry feeding device or the like comprising a hub having a flat bottom surface, means for mounting the hub for rotation about a central vertical axis, a plurality of spokes radiating from an upper portion of the hub and having outwardly open inter-spoke spaces flaring radially outwardly from said hub, and a foot rigid with and depending from each spoke intermediate between the hub and the outer end of the spoke and having a curved surface adapted to be engaged by the advancing link of a conveyor chain for driving the wheel, each of said feet terminating in a free end in substantially the plane of the flat bottom surface of the hub.

3. A non-jamming idler sprocket wheel for the conveyor chain of a poultry feeding device or the like comprising a hub having a flat bottom surface, means for mounting the hub for rotation about a central vertical axis, a plurality of spokes radiating from the hub and having their outer ends free and unconnected with each other and providing inter-spoke spaces flaring radially outwardly from said hub, and a foot rigid with and depending from each spoke intermediate between the hub and the free end of the spoke and having a curved surface adapted to be engaged by the advancing link of a conveyor chain for driving the wheel, each of said feet terminating in a free end in substantially the plane of the flat bottom surface of the hub.

4. In a device for feeding poultry or the like, a trough arranged in a closed circuit, a movable endless conveyor chain in said trough comprising a plurality of horizontal links each having a curved leading edge, a sprocket wheel mounted adjacent to said trough for rotation by said chain comprising a hub having a flat bottom surface and having a plurality of radiating spokes providing radially outwardly open interspoke spaces, and a foot extending vertically from each spoke and having a curved upright surface adapted to be engaged successively by the curved leading edge of each of said horizontal links, each of said feet terminating in a free end in substantially the plane of the flat bottom surface of the hub.

5. In a device for feeding poultry or the like, a trough arranged in a closed circuit, a movable endless conveyor chain in said trough comprising alternating vertical and horizontal links, each of said horizontal links having a curved leading edge, a sprocket wheel mounted adjacent to said trough for rotation on a vertical axis by said chain comprising a hub having a flat bottom surface and having a plurality of radiating spokes providing radially outwardly open inter-spoke spaces, and a foot depending vertically from each spoke and having a curved surface adapted to be engaged successively by the curved leading edge of each of said horizontal links, each of said feet terminating in a free end in substantially the plane of the flat bottom surface of the hub.

6. In a device for feeding poultry or the like, a trough arranged in a closed circuit, a movable endless conveyor chain in said trough comprising alternating vertical and horizontal links, each of said horizontal links having a curved leading edge, a sprocket wheel mounted adjacent to said trough for rotation on a vertical axis by said chain comprising a hub having a flat bottom surface and having a plurality of spokes radiating from the upper portion of the hub and having their outer ends free and unconnected with each other and providing inter-spoke spaces flaring radially outwardly from said hub, and a foot rigid with and depending from each spoke intermediate between the hub and the free end of the spoke and having a curved surface adapted to be engaged successively by the curved leading edge of each of said horizontal links, each of said feet terminating in a free end in substantially the plane of the flat bottom surface of the hub, and said chain being movable through the trough in driving relation to said sprocket wheel with said curved edges of certain of said spokes and horizontal links engaged and with a side of certain of said vertical links engaged with certain of said feet.

7. The combination claimed in claim 1 in which the means mounting the hub comprises a housing enclosing the sprocket wheel and including a removable cover spaced above the hub of the sprocket wheel.

References Cited in the file of this patent

UNITED STATES PATENTS

| | | |
|---|---|---|
| 2,712,379 | Kitson | July 5, 1955 |
| 2,757,784 | Von Stroh | Aug. 7, 1956 |
| 2,782,761 | Martin et al. | Feb. 26, 1957 |
| 2,820,540 | Klinzing | Jan. 21, 1958 |
| 2,863,554 | Cordis | Dec. 9, 1958 |